United States Patent [19]
Carollo

[11] Patent Number: 5,912,650
[45] Date of Patent: Jun. 15, 1999

[54] DICHOPTIC DISPLAY UTILIZING A SINGLE DISPLAY DEVICE

[75] Inventor: Jerome Carollo, Carlsbad, Calif.

[73] Assignee: Kaiser Electro-Optics, Inc., Carlsbad, Calif.

[21] Appl. No.: 08/732,084

[22] Filed: Oct. 16, 1996

[51] Int. Cl.⁶ .................................................. G09G 5/00
[52] U.S. Cl. ................................ 345/7; 348/53; 348/54; 348/588; 349/11
[58] Field of Search ................................ 345/7, 8, 9, 4, 345/5; 348/51, 52, 53, 54, 55, 56, 57, 58, 588; 349/11, 15, 18; 359/630

[56] References Cited

U.S. PATENT DOCUMENTS

| | | | |
|---|---|---|---|
| 4,037,921 | 7/1977 | Cox | 313/524 |
| 4,349,815 | 9/1982 | Spooner | 348/53 |
| 4,550,984 | 11/1985 | Reymond | 345/7 |
| 4,945,408 | 7/1990 | Medina | 348/53 |
| 4,987,410 | 1/1991 | Berman et al. | 349/11 |
| 5,005,083 | 4/1991 | Grage et al. | 348/588 |
| 5,091,719 | 2/1992 | Beamon, III | 348/53 |
| 5,406,299 | 4/1995 | Post | 345/7 |
| 5,530,492 | 6/1996 | Ron | 348/54 |
| 5,572,229 | 11/1996 | Fisher | 348/53 |

OTHER PUBLICATIONS

F.L. Kooi, "Binocular Configurations of a Night–Flight Head–Mounted Display," *Displays* vol. 14, No. 1 (1993) pp. 11–20.

*Primary Examiner*—Daniel J. Wu
*Assistant Examiner*—John Tweel, Jr.
*Attorney, Agent, or Firm*—David G. Beck; Townsend and Townsend and Crew

[57] ABSTRACT

A compact, lightweight dichoptic display system is provided. The system utilizes a single image generating device which alternately provides low resolution, wide field-of-view images with high resolution, narrow field-of-view images of a specific area of the same scene. The light radiated by the image generating device is linearly polarized. The polarized light passes through a controllable retarder, the retarder imparting a 180 degree phase delay to alternating scenes. Using a polarization sensitive beam splitter, the images generated by the display are directed to alternate eyepieces. Collimating optics are used to insure that the two images appear to be the same distance from the user, therefore enabling the user to properly combine the two images.

20 Claims, 9 Drawing Sheets

DICHOPTIC DISPLAY UTILIZING A SINGLE DISPLAY DEVICE

The present invention relates generally to visual display systems and, more particularly, to a compact dichoptic display system which can be used to direct high resolution, narrow field-of-view scenes to one eye of a viewer while directing low resolution, wide field-of-view scenes to the other eye of the viewer.

BACKGROUND OF THE INVENTION

Although in use for years, head mounted display (HMD) systems have been the subject of continual development and improvement. Applications of such systems range from flight and weapons control for military aircraft to display systems for games. Of particular interest are displays which combine multiple images. For example, most modern military aircraft use heads-up display technology to superimpose information for a variety of flight and weapons systems over the pilot's natural view of the outside world. This provides the pilot with additional information without requiring that the pilot look down towards the instrument panel. A second use of head mounted systems is for night vision goggles in which the user is presented with both a natural image of the outside world as well as an artificial image in which the light levels have been intensified. A third use for such systems is to provide a pilot or other user with a low resolution, wide field-of-view image of a particular scene combined with a high resolution image of a small section of the same scene. This allows the user to retain knowledge of the overall surroundings while obtaining detailed information about a particular area of interest.

There are two basic approaches to providing a user simultaneously with multiple images. The first or binocular approach presents both eyes of the user with both images. For example, a pilot may use a see-through HMD of this type which allows a natural view of the outside world. The desired additional information is provided using a projected image, typically projected on the pilot's visor. The second or monocular approach provides each eye of the user with different image information. For example, a pilot flying at night can be presented with a natural view as well as a light intensified view, each view being provided to a separate eye. One advantage of this system is that the eye which is not viewing the light intensified scene remains dark adapted.

U.S. Pat. No. 4,037,921 discloses the use of a monocular approach for a night vision apparatus. The apparatus provides two light intensified views of a particular scene. One view is a low resolution, wide-angle view while the other is a comparatively high resolution, narrow-angle view. In order to allow the user to properly combine the images, the two views are of the same overall magnification.

From the foregoing, it is apparent that a compact, lightweight, dichoptic display is desired. This device is of particular interest in the area of head-mounted displays where size and weight are critical factors.

SUMMARY OF THE INVENTION

The present invention provides a compact, lightweight dichoptic display system which finds particular application in head mounted displays. The system utilizes a single image generating device which alternately provides low resolution, wide field-of-view images with high resolution, narrow field-of-view images of a specific area of the same scene. By using a single image generating device, size, cost, and weight are dramatically decreased.

According to the invention, the light radiated by the image generating device is linearly polarized. The polarized light passes through a controllable retarder, the retarder imparting a 180 degree phase delay to alternating scenes. Using a polarization sensitive beam splitter, the images generated by the display are directed to alternate eyepieces. Collimating optics are used to insure that the two images appear to be the same distance from the user, therefore enabling the user to properly combine the two images.

A further understanding of the nature and advantages of the present invention may be realized by reference to the remaining portions of the specification and the drawings.

DESCRIPTION OF THE PREFERRED EMBODIMENT

Figure 1:
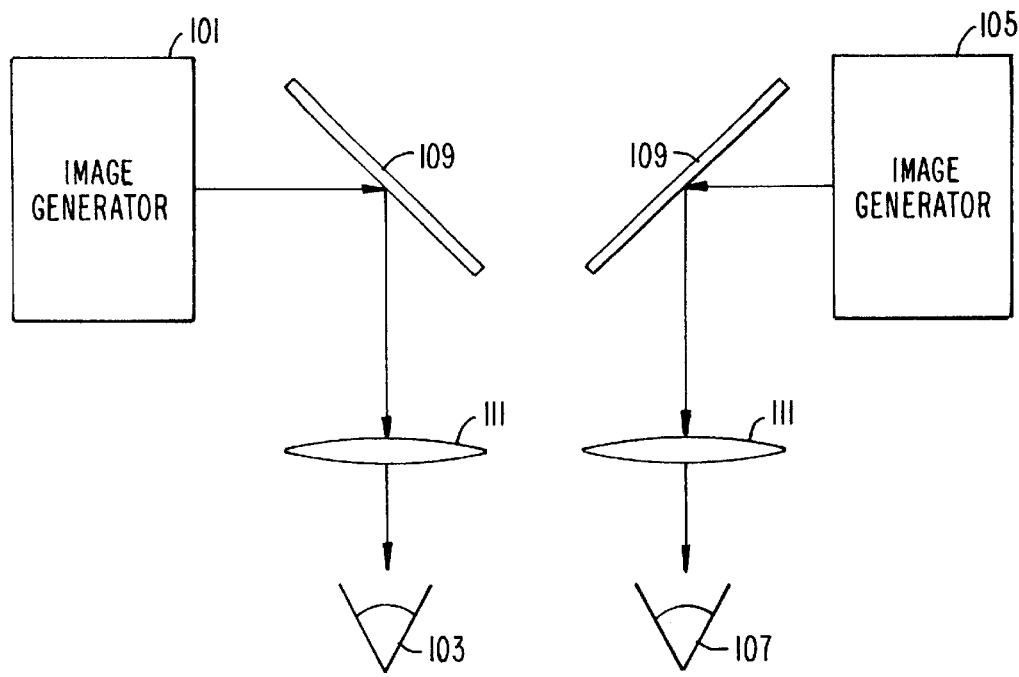
FIG. 1 is an illustration of a prior art dichoptic display device.

FIG. 1 is an illustration of a prior art dichoptic display device. In this device an image generating device 101 supplies an image to one eye 103 of the intended viewer while a second image generating device 105 supplies a second image to a second eye 107 of the viewer. This type of display device also includes various optical components such as fold mirrors 109 and collimating optics 111. Typically the first image is a low resolution, wide field-of-view scene while the second image is a high resolution, narrow field-of-view image of the same scene. The overlapped, low resolution information from the wide field-of-view scene is suppressed by the brain, thus resulting in the two images being combined. The combined image contains both the low resolution, wide field-of-view information with the high resolution, narrow field-of-view information.

Figure 2:
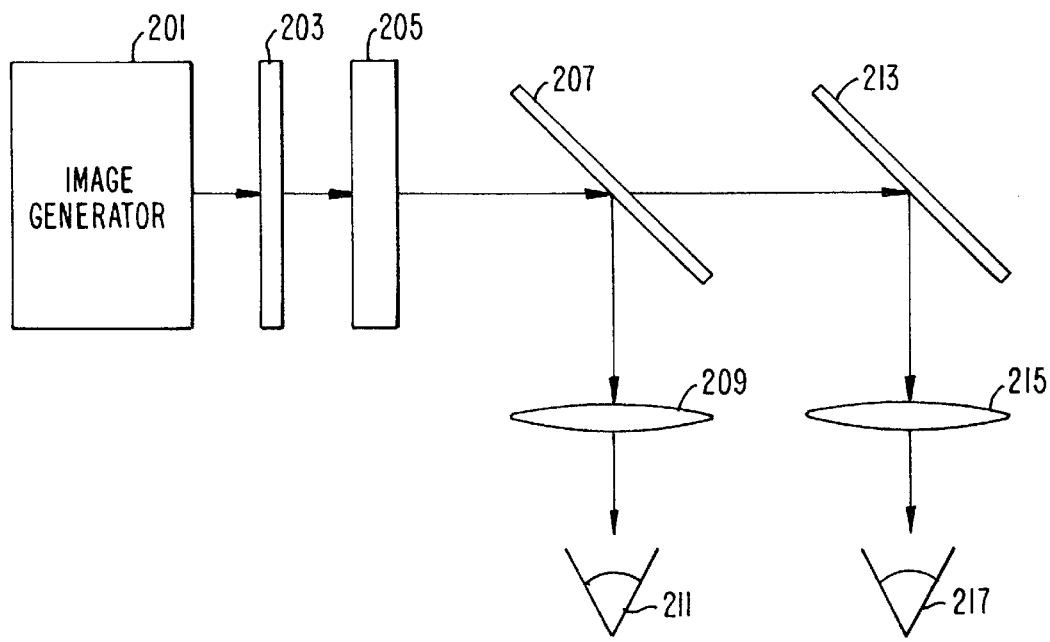
FIG. 2 is an illustration of an embodiment of the invention.

FIG. 2 is an illustration of an embodiment of the invention. The invention utilizes a single image generating device 201, thus providing substantial weight, cost, size, and power savings over the prior art. Image device 201 generates alternating scenes, one set of scenes consisting of low resolution, wide field-of-view information and the alternate set of scenes consisting of high resolution, narrow field-of-view information. Although a variety of different image generators can be used in this invention, preferably image generator 201 is a cathode ray tube (CRT) or a liquid crystal display (LCD).

Unless the light emanating from image generator 201 is automatically polarized, the image light is polarized using a linear polarizer 203. The polarized light is then passed through a retarder 205 which switches the phase of the light between the two orthogonal states of polarization. The rate at which retarder 205 switches the phase of the incident light is set to match the rate, or some integral multiple thereof, that display 201 alternates between low and high resolution scenes. Thus, for example, every time display 201 generates a high resolution image, retarder 205 would apply a zero phase delay to that image. Conversely, every time display 201 generates a low resolution image, retarder 205 would apply a 180 degree phase delay.

A variety of different types of retarders can be used for retarding element 205 ranging from simple half-wave plates to sophisticated electro-optic (EO) devices. Examples of some of the types of devices which can be used as element 205 include pi-cells, ferro-electric materials, Pockel cells, and Kerr cells. Due to the desired retarder switching speeds as well as the intended light weight, low power applications, preferably an EO retarder is used.

After passing through retarder 205, the image light is directed to a polarization sensitive beam splitter 207. Beam splitter 207 either reflects or passes the image light, depending upon the phase delay imparted to the light by retarder 205. For example, beam splitter 207 can be designed to reflect high resolution, narrow field-of-view light which has a zero phase delay while passing low resolution, wide field-of-view light which has a 180 degree phase delay.

The image light which is reflected by beam splitter 207 passes through a set of collimating optics 209 to an eye 211 of the user. The image light which is passed by beam splitter 207 is reflected by a fold mirror 213 through a second set of collimating optics 215 into the user's other eye 217. The focal lengths of collimating optics 209 and 215 are selected so that the image presented to the user via either eye appears to be the same distance from the user. Typically the focal lengths are selected to image the displayed scenes at infinity.

Figure 3:
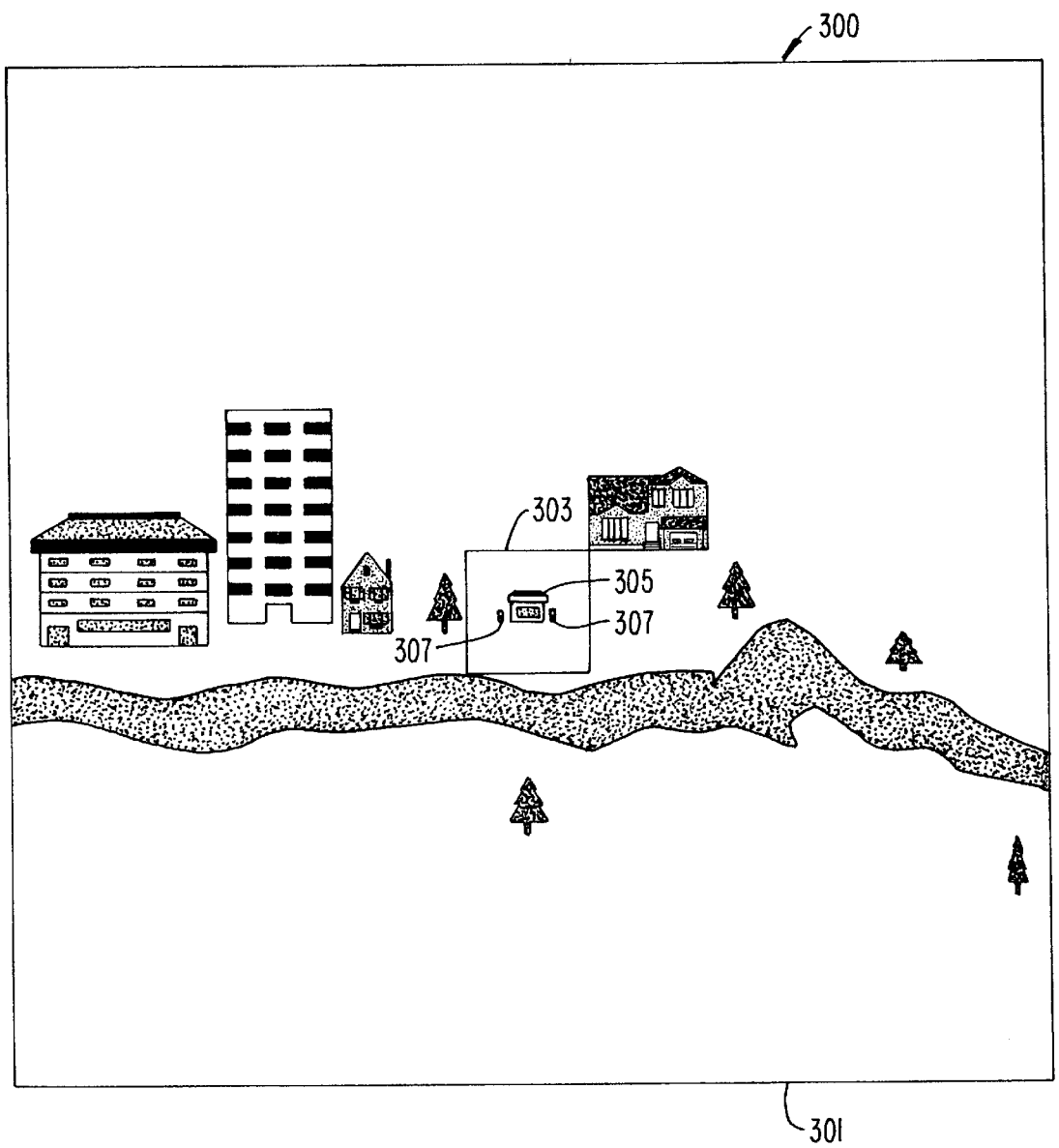
FIG. 3 is an illustration of two views of a single scene utilized by the present invention.

The landscape shown in FIG. 3 illustrates the two views of a single scene 300 utilized by the present invention. The view of scene 300 bordered by block 301 is a wide field-of-view, low resolution scene which provides the viewer with knowledge of the overall topography of the scene. Scene 303 is a narrow field-of-view, high resolution image of the central portion of scene 300. Illustrated in portion 303 is a small building 305 and two accompanying pump stations 307.

Figure 4:
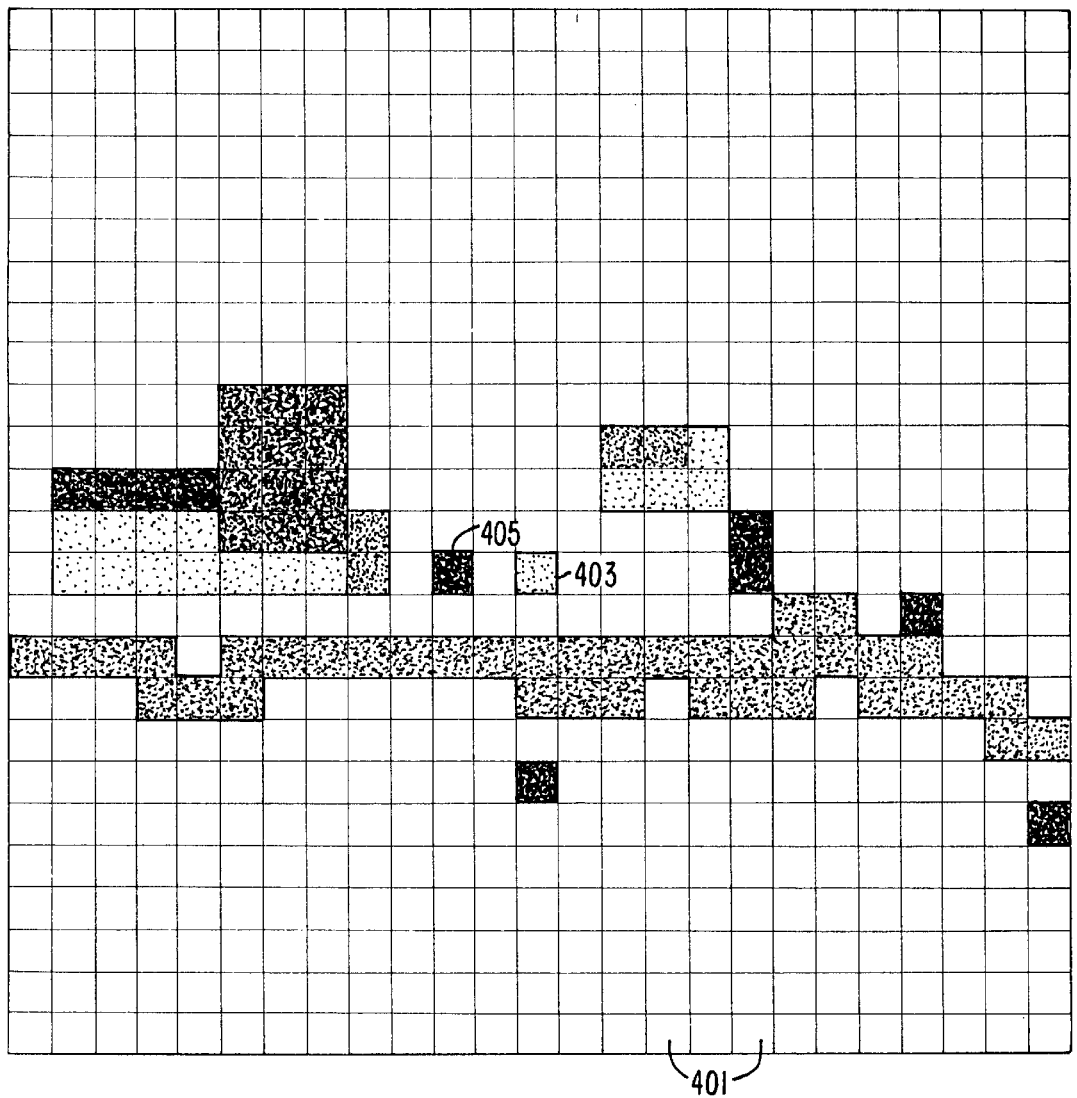
FIG. 4 is an illustration of a low resolution, wide field-of-view image of the scene shown in FIG. 3.
Figure 5:
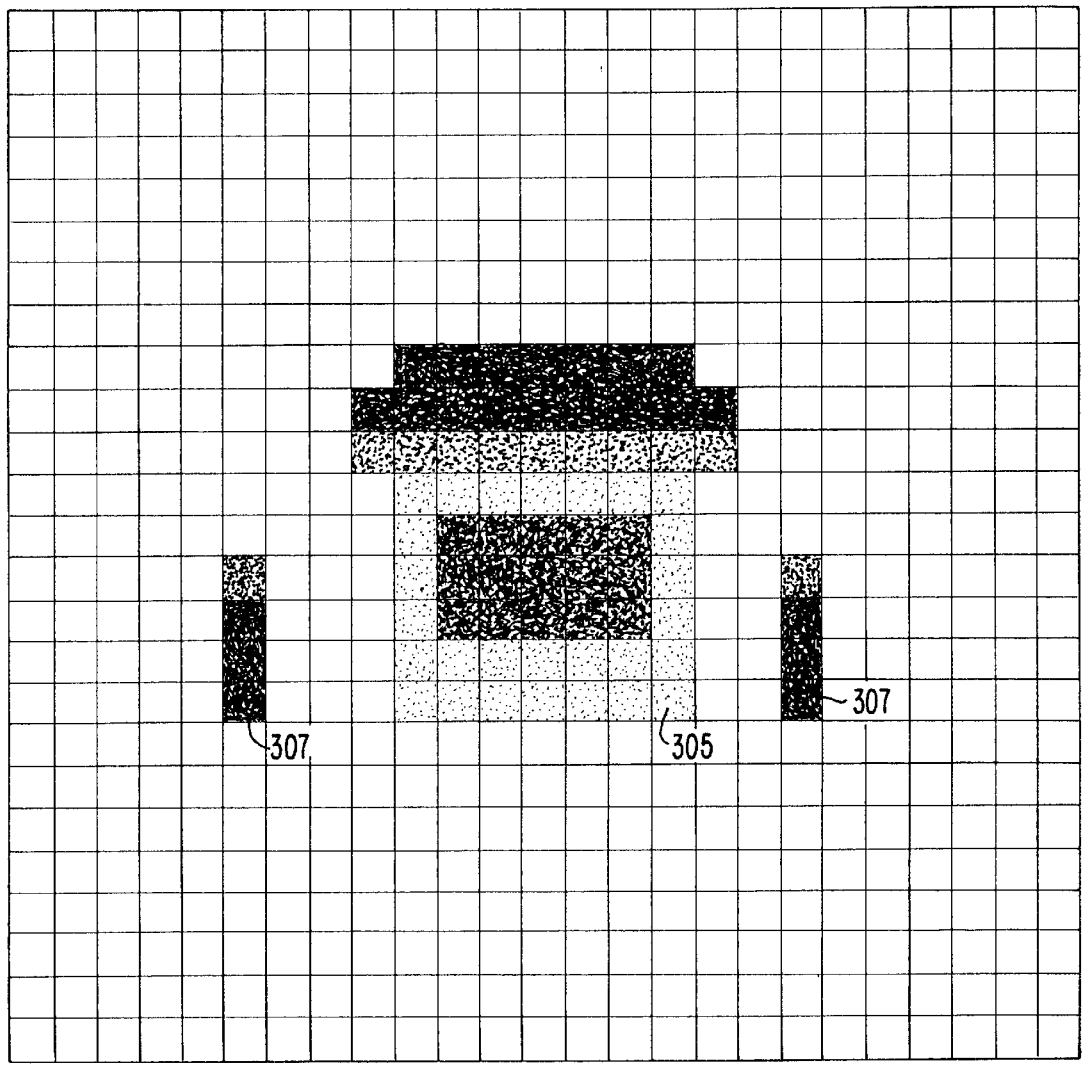
FIG. 5 is an illustration of a high resolution, narrow field-of-view image of a portion of the scene shown in FIG. 3.

FIGS. 4 and 5 illustrate scenes 300 and 303, respectively, as imaged by image generating device 201. In these illustrations device 201 is comprised of a 25 by 25 pixel array, each pixel represented by a block 401. This array is used for illustrative purposes only; typically the number of pixels in image generator 201 would be at least an order of magnitude greater resulting in much higher resolution even in the low resolution, wide field-of-view scene.

In FIG. 4 only 1 pixel 403 is used to generate the image of building 305 and accompanying pump stations 307. Therefore in this image the viewer would only be able to recognize that there is a structure of some form in the general landscape of scene 300. Unless the image generator 201 generates colors, this building would be difficult to distinguish from a nearby tree 405. Given this degree of resolution, the viewer would obviously not be able to discern much detail regarding the individual buildings or other topographical features.

In the high resolution, narrow field-of-view image, all of the pixels are used to generate an image of the structures contained in portion 303 of FIG. 3. Therefore in the present example approximately a ninth of the pixels, or 70 pixels, are used in creating the image of structures 305 and 307. As illustrated in FIG. 5, the increased resolution provided by the increased density of pixels provides the viewer with a much more readily discernable view of building 305 as well as the accompanying pump stations 307.

Figure 6:
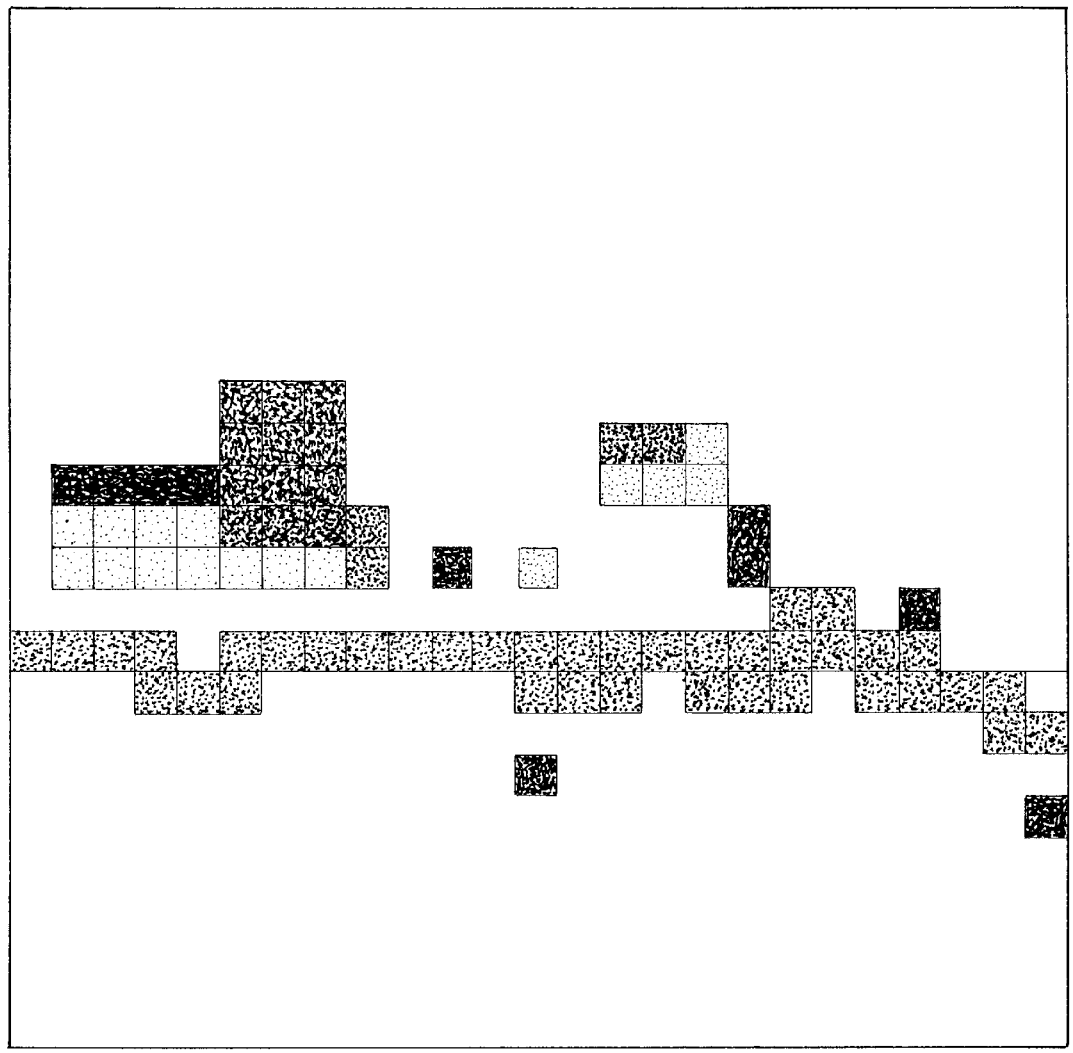
FIG. 6 is an illustration of the low resolution, wide field-of-view image as seen by the left eye of the user in one embodiment of the invention.
Figure 7:
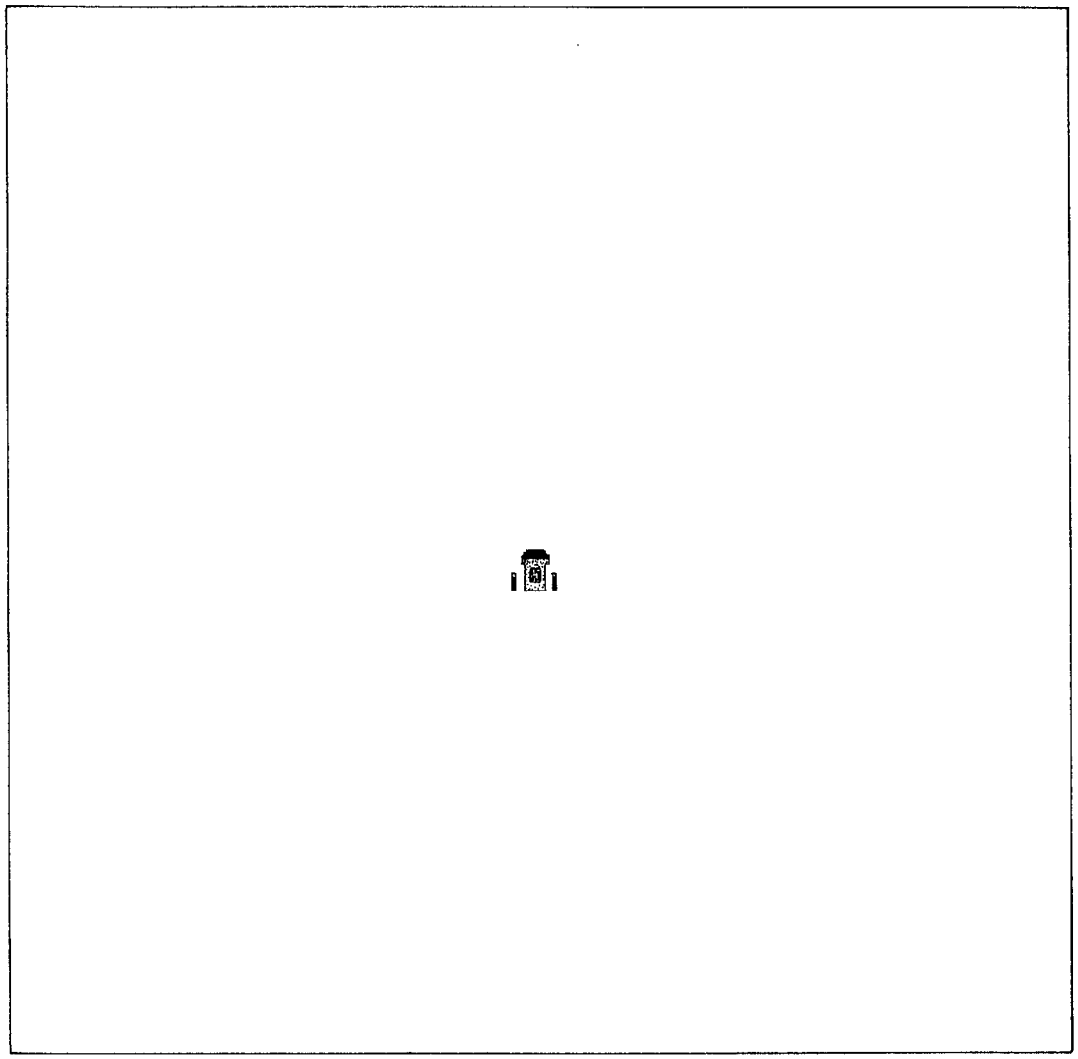
FIG. 7 is an illustration of the high resolultion, narrow field-of-view image as seen by the right eye of the user in one embodiment of the invention.

After passing through optics 209 and 215, the image of portion 303 would subtend the same amount of the user's view from either eye, thus allowing the two images to be superimposed by the user's brain. Therefore the user would see scene 300, as illustrated in FIG. 6, with one eye and see only a small portion of scene 300, as illustrated in FIG. 7, with the other eye.

Figure 8:
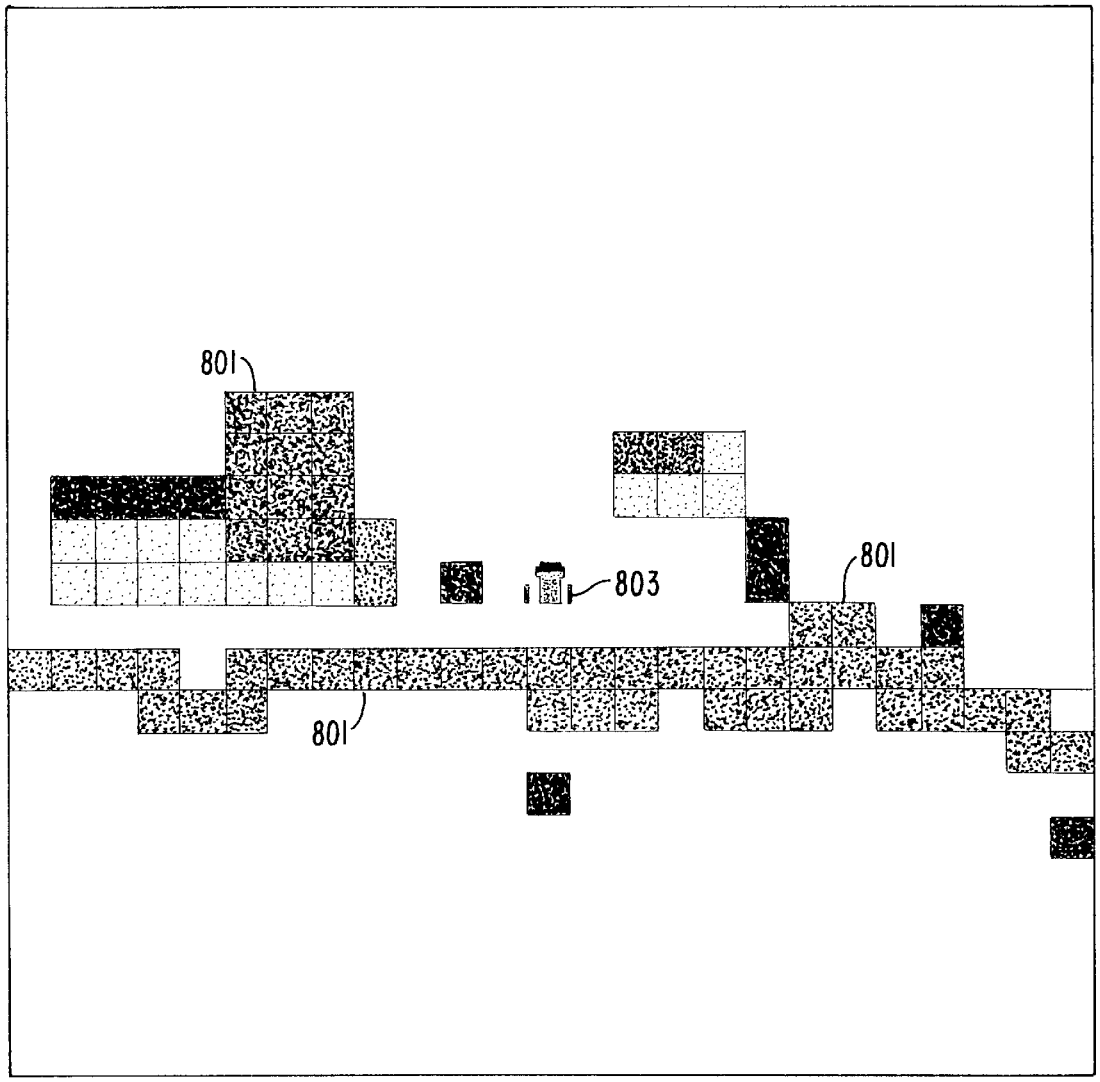
FIG. 8 is an illustration of the composite scene in which the individual scenes illustrated in FIGS. 6 and 7 have been combined by a user.

Under normal usage, the viewer is unconscious of the fact that he or she is actually viewing two distinct images, one per eye. Instead, the viewer simply sees an image as illustrated in FIG. 8. In this image most of scene 801 is perceived as a low resolution image with only a small portion 803 of the scene having a much higher resolution. In order to insure that the viewer is unaware of the differences between the imagery provided to the individual eyes, image generating device 201 must rapidly alternate between the two images. Given the image persistence of the human eye, preferably image generator 201 operates at at least 60 Hz, thus providing 30 Hz image repetition per eye.

Depending upon the type of image generating device 201 employed in the system, the individual pixels may have relatively sharp edges. These edges, which may appear to the viewer as a series of sharp, black lines, make it difficult to focus on the image as opposed to the grid of lines. This effect may be exacerbated in the low resolution view. In order to avoid this problem, preferably the system includes at least one optical filter which scatters the light from the pixel edges, thus softening the edges.

Figure 9:
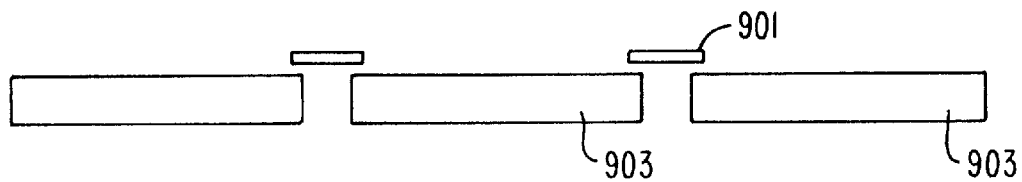
FIG. 9 is an illustration of the cross-section of one embodiment of an optical filter used to soften the edges of the pixels.
Figure 10:
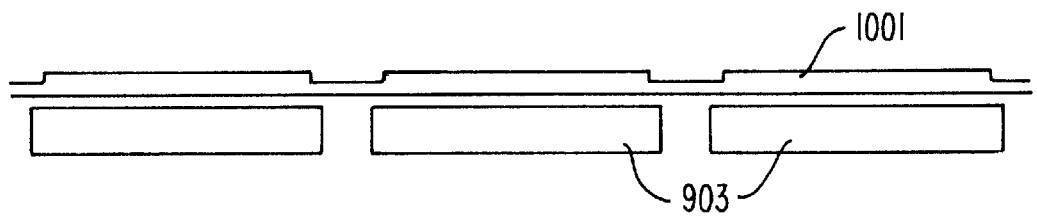
FIG. 10 is an illustration of the cross-section of a second embodiment of an optical filter used to soften the edges of the pixels.
Figure 11:
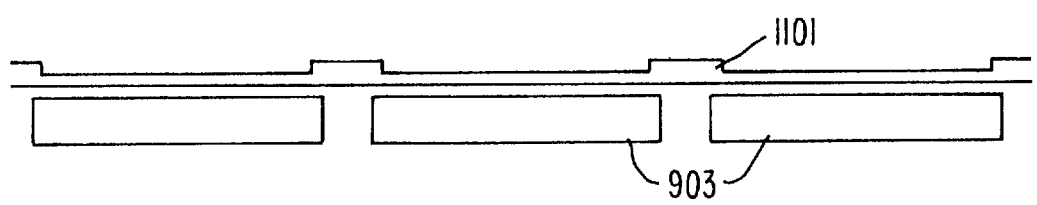
FIG. 11 is an illustration of the cross-section of a third embodiment of an optical filter used to soften the edges of the pixels.

FIGS. 9–11 illustrate the cross-section of three different optical filters which can be used to soften the pixel edges. In FIG. 9 the filter consists of a grid-like structure of transparent material 901, the grid overlaying the edges of the pixels 903. In FIG. 10 the filter is a continuous sheet of transparent material 1001 in which blocks of material are raised above each of the central portions of pixels 903. In FIG. 11 the filter is a continuous sheet of transparent material 1101 in which a grid is raised above the edges of pixels 903. In each of the illustrated filters, a combination of diffraction and scattering effects causes light emanating from the individual pixels to fill the void between the pixels, thus substantially lessening the pixel edge effect.

Figure 12:
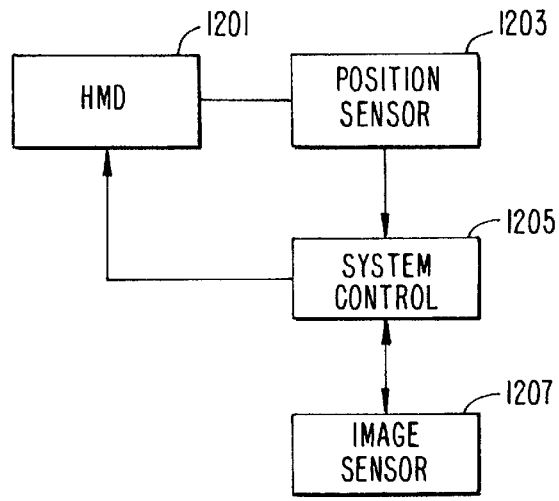
FIG. 12 is a block diagram illustrating the tracking capability of a head mounted dichoptic display according to the present invention.

In the preferred embodiment of the invention, the view presented to the user changes in accordance with the position of the user's head. FIG. 12 is a block diagram illustrating how this aspect of the invention works. An HMD 1201 is comprised of an image generating device as well as the necessary optical components as described above with reference to FIG. 2. In an alternate embodiment the image generating device 201 and one or more of the optical components may be remotely mounted with the image sent to the user via fiber optics. The position of the HMD, and therefore the user's head, is monitored using a position sensor 1203. Techniques of monitoring head position are well known by those skilled in the art.

Position sensor 1203 provides the position of HMD 1201 to a system controller 1205. Controller 1205 directs image sensor 1207 to the appropriate position. For example, if HMD 1201 moves to the right by 20 degrees and up by 10 degrees, controller 1205 shifts sensor 1207 by the same amount. Controller 1205 may also be designed to move sensor 1207 by an amount proportional to the movement of the HMD. For example in order to give the user more precise viewing control, sensor 1207 may move 1 degree for every 2 degrees of actual head movement.

In an alternate embodiment of the invention, the system is combined with a see-through display, thus providing the user with an augmented reality. This embodiment is particularly useful for night vision applications or when it is useful to provide the user with additional information regarding a scene under view, for example wiring harness or circuit board information.

Figure 13:
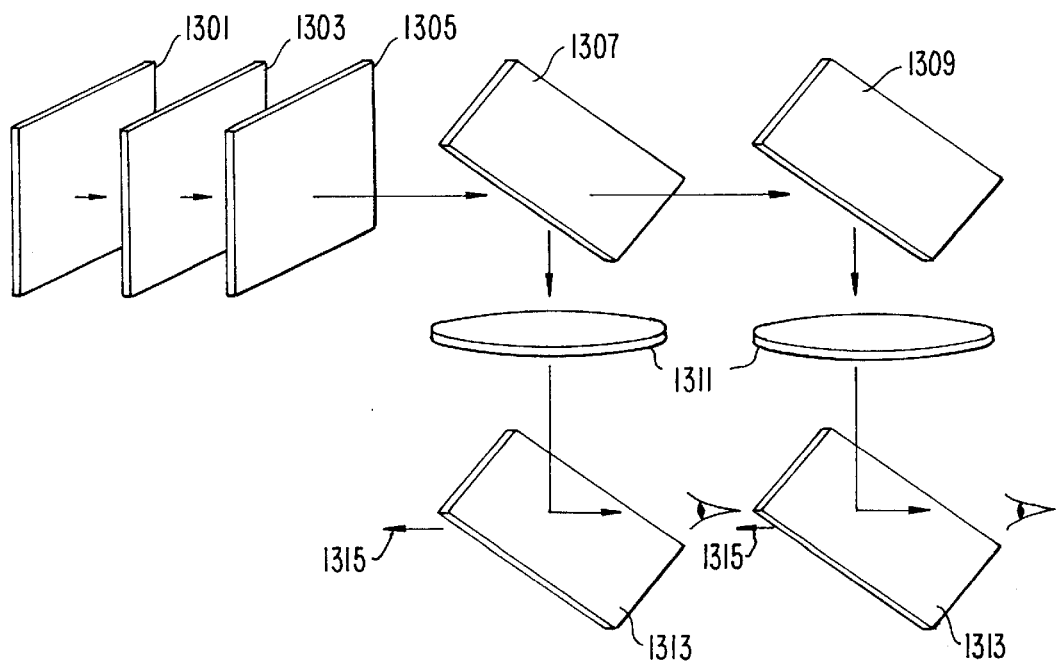
FIG. 13 is an illustration of an augmented reality embodiment of the invention.

FIG. 13 is an illustration of an augmented reality embodiment of the invention. As in the embodiment illustrated in FIG. 2, this embodiment utilizes an image generator 1301, a polarizing element 1303, a switchable retarder 1305, a polarization sensitive beam splitter 1307, a fold mirror 1309, and optical elements 1311 to match the magnification of the images presented to each eye with each other as well as with the outside world. This embodiment also includes beam splitters 1313 which allow the viewer to see images both from the outside 1315 and the image generator 1301. The percentage of transmitted light versus reflected light for beam splitters 1313 depends upon the application. Preferably beam splitters 1313 are in the optical path after optics 1311. If the splitters 1313 are placed in the optical path before optics 1311, the user views the outside scene through the optics thereby causing the outside scene to be distorted.

As in the previously described embodiment of the invention, the embodiment of the invention illustrated in FIG. 13 allows one eye of the user to receive low resolution, wide field-of-view information and the other eye to receive high resolution, narrow field-of-view information. For example, if this embodiment is used for night vision, the viewer is able to see the dark outside scene 1315 through beam splitters 1313 as well as the enhanced scene generated by device 1301. The enhanced scene may be generated utilizing an infrared (IR) sensor which tracks the motion of the user's head. Preferably one of the user's eyes is fed low resolution, wide field-of-view IR data while the other eye is fed high resolution, narrow field-of-view IR data. This implementation is ideally suited for such applications as military reconnaissance in which the viewer requires knowledge of the overall surroundings as well as detailed information on particular areas of interest.

Accordingly, the disclosures and descriptions herein are intended to be illustrative, but not limiting, of the scope of the invention which is set forth in the following claims.

I claim:

1. A dichoptic display apparatus, comprising:
   an image source generating linearly polarized image light, wherein said image source alternates at a predetermined rate between images of a first type and images of a second type, wherein said first type of image is a low resolution, wide field-of-view image and said second type of image is a high resolution, narrow field-of-view image of a portion of said first type of image;
   a retarding element, wherein said retarding element alters at an integral multiple of said predetermined rate the phase of said polarized image light between a first phase and a second phase; and
   a first beam splitter, wherein said first beam splitter reflects image light of said first phase to a first viewing site and passes image light of said second phase to a second viewing site.

2. The dichoptic display apparatus of claim 1, wherein said image source is further comprised of an image generator and a linear polarizing element.

3. The dichoptic display apparatus of claim 1, wherein said retarding element is an electro-optic device.

4. The dichoptic display apparatus of claim 3, wherein said electro-optic device is a liquid crystal shutter, and wherein said first phase is a 180 degree phase delay and said second phase is a 0 degree phase delay, said liquid crystal shutter shifting the phase of said polarized image light from said second phase to said first phase when electricity is applied to said shutter.

5. The dichoptic display apparatus of claim 1, wherein said first type of image corresponds to said first phase and said second type of image corresponds to said second phase, said first phase having a 180 degree phase delay and said second phase having a zero degree phase delay.

6. The dichoptic display apparatus of claim 5, further comprising a fold mirror, wherein said first beam splitter directs said polarized image light of said first phase to a first eye viewing area and said first beam splitter passes said polarized image light of said second phase to said fold mirror, said fold mirror directing said polarized image light of said second phase to a second eye viewing area.

7. The dichoptic display apparatus of claim 6, further comprising:
   a first lens assembly with a first focal length interposed between said first beam splitter and said first eye viewing area such that said first type of image appears to be a first distance away; and
   a second lens assembly with a second focal length interposed between said fold mirror and said second eye viewing area such that said second type of image appears to be a second distance away, wherein said first distance and said second distance are substantially equivalent.

8. The dichoptic display apparatus of claim 1, wherein said image source is selected from the group consisting of liquid crystal displays and cathode ray tubes.

9. The dichoptic display apparatus of claim 1, wherein said dichoptic display apparatus is attached to a user's head and wherein said images of said first and second types vary according to the position of said user's head.

10. The dichoptic display apparatus of claim 7, further comprising:
    a second beam splitter between said first lens assembly and said first eye viewing area, wherein said first type of image is simultaneously observable with an image of a third type; and
    a third beam splitter between said second lens assembly and said second eye viewing area, wherein said second type of image is simultaneously observable with said third type of image.

11. The dichoptic display apparatus of claim 10, wherein said third type of image is a viewers natural environment.

12. A method of displaying multiple scenes to a user, the method comprising:

generating image light representing a plurality of scenes of a first type with an image source;

generating image light representing a plurality of scenes of a second type with said image source, wherein said image source alternates at a predetermined rate between generating scenes of said first type with generating scenes of said second type, and wherein said scenes of a first type are low resolution, wide field-of-view scenes and said scenes of said second type are high resolution, narrow field-of-view scenes which represent a portion of said scenes of said first type;

linearly polarizing said image light;

alternatively retarding at an integral multiple of said predetermined rate said polarized image light from 180 degrees to 0 degrees, wherein said first type of scenes are retarded by 180 degrees and said second type of scenes are retarded by 0 degrees; and reflecting said 180 degree retarded, polarized image light and passing said 0 degree retarded, polarized image light with a polarization sensitive beam splitter, wherein said reflected image light is directed to a first viewing site and said passed image light is directed to a second viewing site.

13. The method of claim 12, wherein said retarding step is performed with a liquid crystal shutter.

14. The method of claim 12, further comprising the steps of:

collimating said reflected image light prior to said reflected image light reaching said first viewing site, wherein said first viewing site is a first eyepiece; and collimating said passed image light prior to said passed image light reaching said second viewing site, wherein said second viewing site is a second eyepiece.

15. The method of claim 14, wherein said scenes of said first type at said first eyepiece and said scenes of said second type at said second eyepiece have substantially equivalent magnifications.

16. The method of claim 14, wherein said scenes of said first type at said first eyepiece and said scenes of said second type at said second eyepiece appear equidistant from said user.

17. The method of claim 12, wherein a first beam splitter directs said reflected image light to said first viewing site, a second beam splitter directs said passed image light to said second viewing site, and wherein said first type of scenes are simultaneously observable with a third type of scenes and said second type of scene are simultaneously observable with said third type of scenes.

18. A dichoptic display apparatus, comprising:

an image source generating linearly polarized image light, wherein said image source alternates at a predetermined rate between images of a first type and images of a second type, wherein said first type of image is a low resolution, wide field-of-view image and said second type of image is a high resolution, narrow field-of-view image of a portion of said first type of image;

a retarding element, wherein said retarding element alters at an integral multiple of said predetermined rate the phase of said polarized image light between a first phase and a second phase, wherein said first type of image corresponds to said first phase and said second type of image corresponds to said second phase, said first phase having a 180 degree phase delay and said second phase having a zero degree phase delay;

a first beam splitter, wherein said first beam splitter reflects image light of said first phase to a first viewing site and passes image light of said second phase to a second viewing site;

a fold mirror, wherein said first beam splitter directs said polarized image light of said first phase to a first eye viewing area and said first beam splitter passes said polarized image light of said second phase to said fold mirror, said fold mirror directing said polarized image light of said second phase to a second eye viewing area;

a first lens assembly with a first focal length interposed between said first beam splitter and said first eye viewing area such that said first type of image appears to be a first distance away;

a second lens assembly with a second focal length interposed between said fold mirror and said second eye viewing area such that said second type of image appears to be a second distance away, wherein said first distance and said second distance are substantially equivalent;

a second beam splitter between said first lens assembly and said first eye viewing area, wherein said first type of image is simultaneously observable with an image of a third type; and a third beam splitter between said second lens assembly and said second eye viewing area, wherein said second type of image is simultaneously observable with said third type of image.

19. The dichoptic display apparatus of claim 18, wherein said third type of image is a viewers natural environment.

20. A method of displaying multiple scenes to a user, the method comprising:

generating image light representing a plurality of scenes of a first type with an image source;

generating image light representing a plurality of scenes of a second type with said image source, wherein said image source alternates at a predetermined rate between generating scenes of said first type with generating scenes of said second type;

linearly polarizing said image light;

alternatively retarding at an integral multiple of said predetermined rate said polarized image light from 180 degrees to 0 degrees, wherein said first type of scenes are retarded by 180 degrees and said second type of scenes are retarded by 0 degrees;

reflecting said 180 degree retarded, polarized image light and passing said 0 degree retarded, polarized image light with a polarization sensitive beam splitter, wherein said reflected image light is directed to a first viewing site and said passed image light is directed to a second viewing site; and wherein a first beam splitter directs said reflected image light to said first viewing site, a second beam splitter directs said passed image light to said second viewing site, and wherein said first type of scenes are simultaneously observable with a third type of scenes and said second type of scene are simultaneously observable with said third type of scenes.

* * * * *